Nov. 6, 1945.　　　C. POPPER　　　2,388,571
HYDRAULIC COUPLING
Filed Aug. 19, 1941　　　2 Sheets-Sheet 1
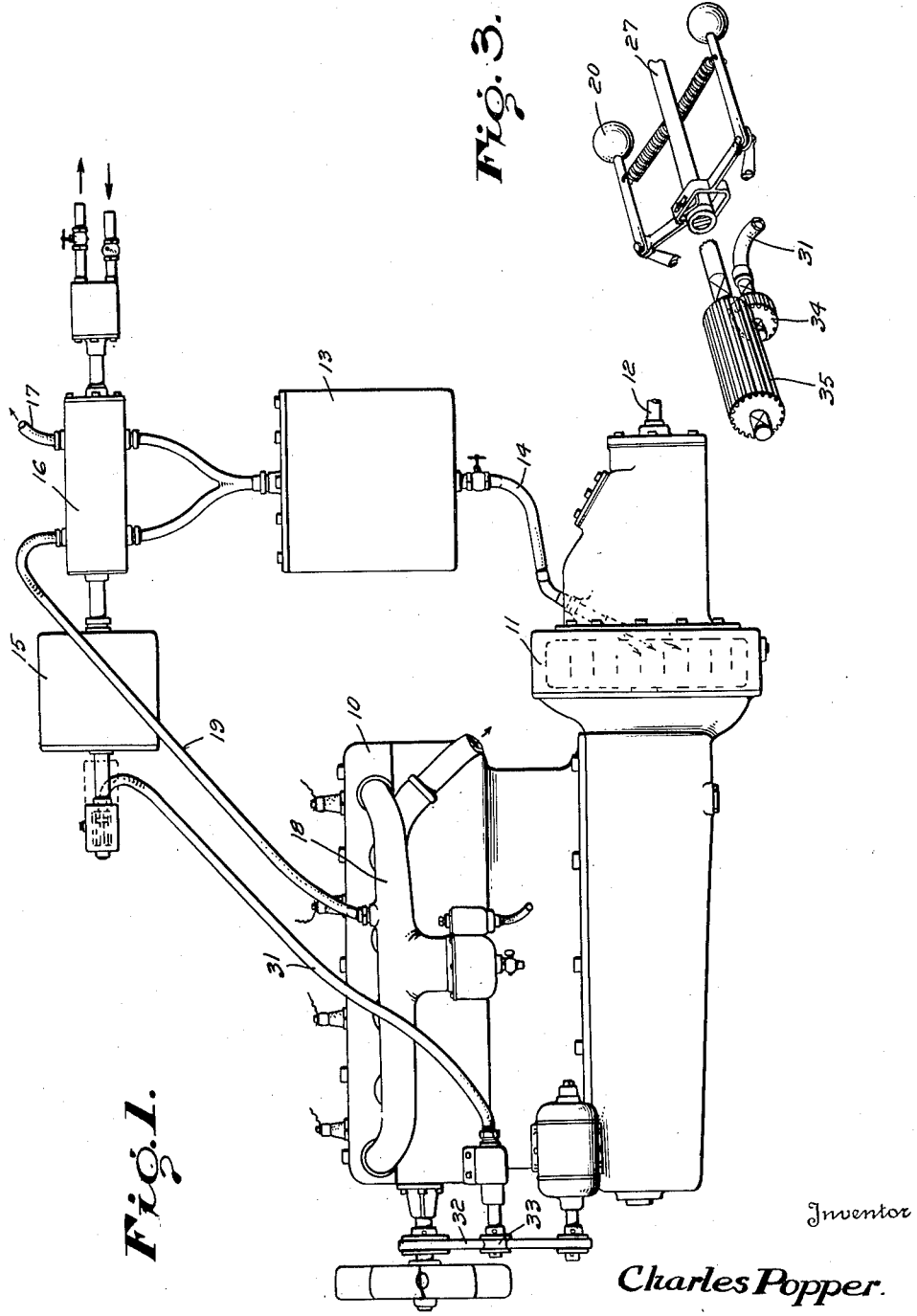
Inventor
Charles Popper.
By
Nathaniel Frucht
Attorney Nov. 6, 1945. C. POPPER 2,388,571
HYDRAULIC COUPLING
Filed Aug. 19, 1941 2 Sheets-Sheet 2
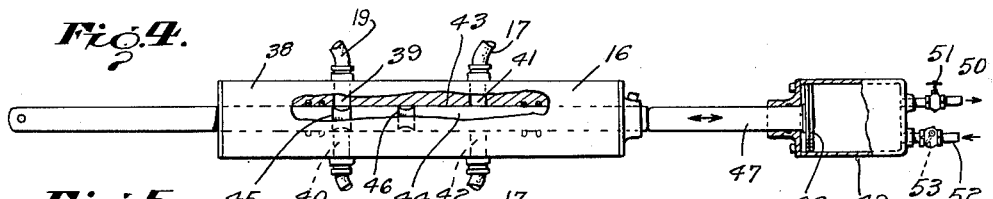
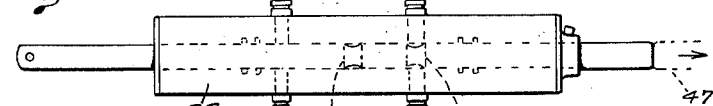
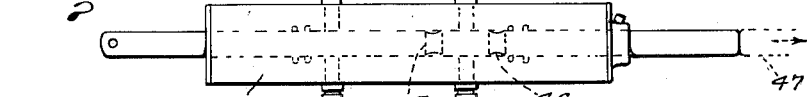
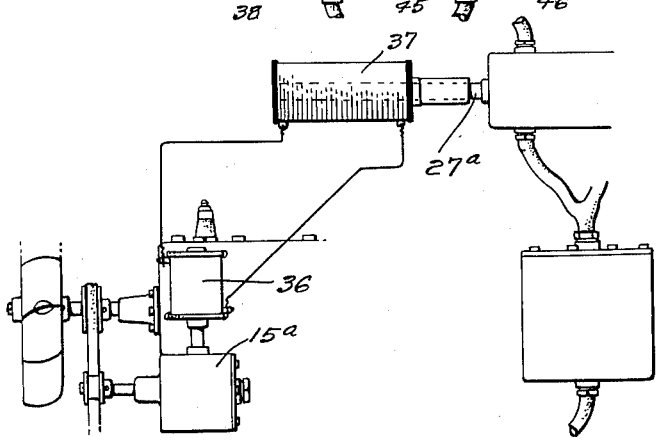
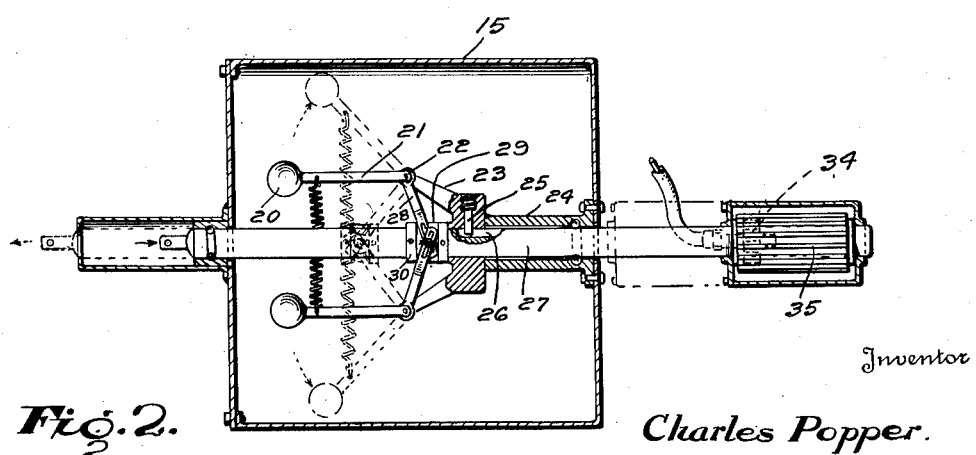
Inventor
Charles Popper.
By Nathaniel Frucht
Attorney Patented Nov. 6, 1945

2,388,571

UNITED STATES PATENT OFFICE 2,388,571

HYDRAULIC COUPLING

Charles Popper, New York, N. Y., assignor to Automatic Turbine Drive Company, Inc., a corporation of New York Application August 19, 1941, Serial No. 407,421

2 Claims. (Cl. 60—54)

My present invention relates to hydraulic couplings, and has particular reference to arrangements for controlling the operation thereof when used for the transmission of automotive power.

It is the principal object of my invention to provide means for obtaining a desired percentage of slip between the coupling rotors under idling and stand-still conditions.

Another object of my invention is to provide a system of control which has superior acceleration when power transmission is to be effected.

Still another object is to provide a system which is automatic in operation.

A further object is to obtain an automatic control with a minimum number of parts.

With the above and other objects and advantageous features in view, the invention consists of a novel arrangement of parts and a novel method of control more fully disclosed in the detailed description following, in conjunction with the accompanying drawings, and more specifically defined in the claims appended thereto.

In the drawings:

Fig. 1 is a diagrammatic view showing the arrangement of parts for the novel control;

Fig. 2 is a sectional detail of a suitable governor control;

Fig. 3 is a perspective detail of the governor gearing;

Figs. 4, 5, and 6 are sectional details showing a suitable valve arrangement in different positions for obtaining the desired flow conditions; and Fig. 7 is a sectional detail of a modified valve movement control.

It has been found desirable to provide an automatic control for hydraulic couplings of the type shown in U. S. Patents Nos. 2,179,518, 2,179,519, and 2,179,520, and particularly when used for automotive power transmission to obtain complete or substantially complete slip between the coupling rotors at idling speeds and to quickly accelerate and reduce the slip to operating conditions when power transmission is required. To this end, I have devised a control for a system such as shown in the patents cited above which automatically withdraws operating fluid from the rotor housing when the automotive vehicle is idling or stopping, to thus provide the desired slip between the rotors, and which returns the operating fluid quickly to the rotor housing when power operation is required, the flow of the hydraulic fluid to and from the rotor housing when idling and during acceleration being controlled by the speed of the engine, and being automatically controlled by the hydraulic coupling system when transmitting power.

Referring to the drawings, Fig. 1 diagrammatically illustrates a hydraulic coupling system, having an engine 10 coupled to a hydraulic coupling 11 which is preferably of the opposed rotor type shown in the U. S. patents referred to, the driven rotor being keyed to the driven shaft 12. A tank 13, preferably of the closed type, is connected to the rotor housing as by means of a conduit 14 and a governor 15 is operatively connected to the engine to operate a valve mechanism 16 in direct correspondence with changes in engine speed.

The valve mechanism 16 is designed to selectively communicate the tank 13 with the atmosphere through a by-pass 17, or with the intake manifold 18 of the engine through a conduit 19, or in its third position to seal the tank from the atmosphere and from the intake manifold and thus render the hydraulic coupling system a closed system.

The governor 15 may be of any desired type, designed to shift the control valve in accordance with change of engine speed. An illustrative construction is shown in Fig. 2, and includes weights 20 secured to links 21 which are pivoted as at 22 to support standards 23 which extend from a bearing 24; the bearing 24a mounted on the valve control rod 27 and engaging the forward end of a collar having a key 25 slidably positioned in a slot 26 in the valve control rod 27, the latter being reciprocatingly housed in the governor casing. The links 21 are secured to links 28 to form pivoted bell-cranks which have their ends slidably secured to a collar 29 rotatably mounted between collars 30 fixed to the rod 27, (whereby movement of the weights 20 produces a longitudinal movement of the rod 27).

As shown in Figs. 1 and 2, a flexible shaft 31 is mounted to be rotated by the engine shaft through a suitable connection such as the generator drive belt 32 and pulley 33, for rotating a gear 34 which is engaged with an extended gear 35, connected to the rod 27, to thus rotate the weights 20, (whereby the movement of the weights 20 produces a longitudinal movement of the rod 27). Any other suitable means for obtaining the desired predetermined movement of the valve rod 27 and the control valve may be used, a solenoid actuated mechanism being shown in Fig. 7; in this embodiment a governor 15a is directly rotated in response to engine speed and shifts contact members in a contact box 36, which in turn causes current to flow to a solenoid 37 and thus reciprocate a valve control rod 27a.

The control valve may be of any desired type, an illustrative form being illustrated in Figs. 4 to 6, and comprising a valve housing 38 which has aligned ports 39, 40 and 41, 42 the ports 39, 40 communicating the tank interior at the upper portion thereof, with the engine manifold connection 19, and the ports 41, 42 similarly communicating the tank interior at the upper portion thereof with the atmosphere by-pass 17. The housing 38 has a cylindrical valve seat 43 which receives a cylindrical valve 44 having spaced flow-recesses 45, 46 whereby communication between the aligned ports 41, 42 through the recess 46 or between aligned ports 39, 40 through recess 45 may be established selectively, the recesses being spaced to provide a neutral position when desired, as shown in Fig. 6.

Since it is preferred to have the valve move slowly, when engine speed increases, but to return quickly when engine speed decreases, an auxiliary arrangement such as shown in Fig. 4 may be used, for operative connection to the control valve. For this purpose, the valve end may be extended as illustrated at 47 in Fig. 4 for attachment to a damping piston 48 positioned in a cylinder 49, the cylinder on the other piston end portion having an air outflow passage 50 provided with a flow passage adjustable check 51, and also having an air inflow passage 52 provided with a one way valve 53, preferably of the hinged type.

When the automotive unit, for example a passenger automobile, is standing still at a traffic light, the rotor idles, and the control valve is in the position shown in Fig. 4, as the governor is rotating at relatively slow speed. In this position, the suction from the intake manifold, which is in communication with the tank, creates a vacuum in the tank and draws operating fluid from the rotor housing into the tank, to thus obtain the desired slip between the rotors. The seals will leak air in to the coupling, but prevent fluid from leaking out.

When the traffic light changes and the accelerator pedal is depressed the motor begins to accelerate. At a predetermined speed, about 800 R. P. M. for a four cylinder car, the governor operates to shift the control valve to the position shown in Fig. 5 and atmospheric pressure is admitted to the tank to break the vacuum and thus permit the drawn-in operating fluid to return to the rotor housing. As the speed increases, the valve assumes the position shown in Fig. 6 and the hydraulic coupling system becomes completely closed and operates as disclosed in the U. S. Patents Nos. 2,179,518, 2,179,519, and 2,179,520.

When the speed decreases below the predetermined speed for power operation, the governor returns the valve to provide the desired suction connection and thus withdraws operating fluid from the rotor housing to the tank.

The transfer of operating fluid as described above should be quick, and it is preferred to make the flow connections of ample size to permit the desired quick transfer; if desired, a momentary pressure connection such as an exhaust pipe connection in place of or in addition to the atmosphere by-pass, may be used to still further speed up the return of hydraulic fluid from the tank.

The operating characteristics of a system as above described are particularly desirable when used with a four cylinder engine, such as Willys.

With such an engine, the desired idling speed of 600 R. P. M. has substantially complete slip; under these conditions, there is turbulence in the hydraulic fluid in the rotor housing, but the withdrawal of fluid into the tank tends to decrease the turbulence and the heat evolved during idling.

When the accelerator is depressed, the R. P. M. rise quickly, and the removed fluid begins to return to the coupling, the car quickly picking up speed; the tank now opens to atmosphere, and at a speed of nine miles per hour there is a flow of operating fluid back from the tank and flow conditions in the coupling begin to stabilize; the engine speed being dragged down until at 17½ miles per hour the engine input and the turbine output operate more uniformly and the car speed increases with engine speed increase.

It is thus evident that the described arrangement of parts and the control obtained produce very desirable operating conditions, namely, full or substantially full slip at low speeds, quick pickup while accelerating, and substantially complete power transmission at operating speeds.

There is thus an initial acceleration of the engine, then a quick transmission of power to the driven shaft with a coincident pull down of the engine speed, and then a steady rise in the power transmitted as the engine speed increases again.

While I have described a specific system suitable for carrying out the invention, it is obvious that changes in the arrangement of the parts, in their relative operation, and in the details of their construction, may be made to suit the requirements for any automotive use, or for using the hydraulic coupling in conjunction with any type of stationary engine or prime mover, without departing from the spirit and the scope of the invention as defined in the appended claims.

I claim:

1. In combination, a prime mover, a hydraulic coupling of the normally closed type for transmitting power from said prime mover to a driven shaft, a tank for hydraulic fluid in free communication with said coupling for gravity feed of fluid to said coupling, means operating at low speed of said prime mover for excluding atmospheric pressure while communicating said tank with a source of sub-atmospheric pressure to thereby transfer fluid from said coupling to said tank, means operating at a still higher speed for closing said communication and opening said tank to atmosphere to thereby return fluid from said tank to said coupling, and means operating at a still higher speed for retaining said sub-atmospheric pressure communication closed and for closing said tank to atmosphere during subsequent power transmission.

2. In combination, a prime mover, a hydraulic coupling of the normally closed type for transmitting power from said prime mover to a driven shaft, a tank for hydraulic fluid in free communication with said coupling for gravity feed of fluid to said coupling, means operating at low speed for excluding atmospheric pressure while communicating said tank with a source of sub-atmospheric pressure to thereby transfer fluid from said coupling to said tank, means operating at a higher speed for closing said communication and opening said tank to atmosphere to thereby return fluid from said tank to said coupling, means operating at a still higher speed for retaining said sub-atmospheric pressure communication closed and for closing said tank to atmosphere during subsequent power transmission, and means for operating all of said aforesaid means in response to change of speed of the prime mover.

CHARLES POPPER.